Oct. 30, 1962     G. ALFIERI     3,061,382
DOUBLE DISTRIBUTOR WITH HAND-CONTROL TO BRAKE THE TRAILER
OR SEMITRAILER WITH EMBODIED STOP SWITCH
Filed July 20, 1959
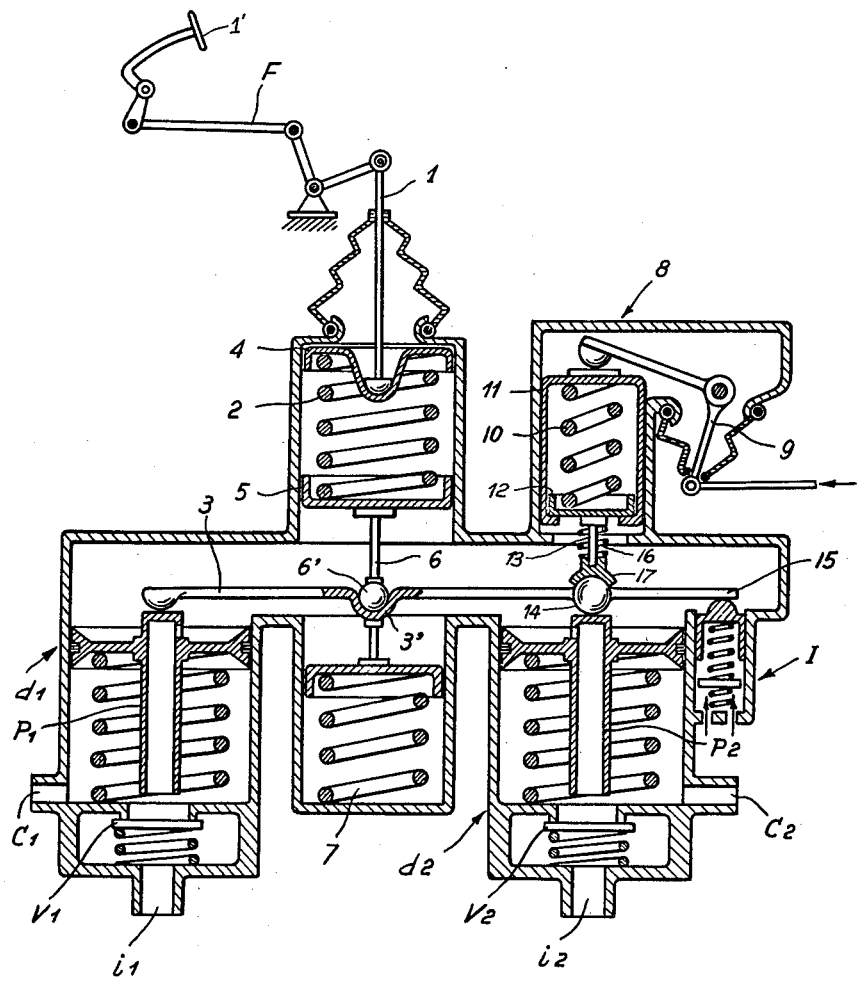

3,061,382
DOUBLE DISTRIBUTOR WITH HAND-CONTROL TO BRAKE THE TRAILER OR SEMITRAILER WITH EMBODIED STOP SWITCH
Giuseppe Alfieri, Milan, Italy, assignor to Fabbrica Italiana Magneti Marelli S.p.A., Milan, Italy, a firm
Filed July 20, 1959, Ser. No. 828,404
Claims priority, application Italy July 22, 1958
3 Claims. (Cl. 303—53)

This invention relates to a double air pressure distribution plant for braking vehicles, as a tractor unit and a trailer unit. More particularly, the invention relates to such an air pressure distribution plant wherein an operating push rod is connected to the brake pedal of the tractor unit and resiliently operates a rocker to control the two distributors of the distribution plant.

Hand pneumatic braking of trailers or semitrailers is usually performed through an auxiliary distributor that is accessible from the driver's seat. This system requires fitting of suitable pipes and devices such as:

A connection pipe between the tank and the auxiliary distributor;

A connection pipe between the auxiliary distributor and the trailer brake tube;

A double cutting off valve in the connection to the trailer brake tube. As it is well known, this valve permits operation of the trailer brakes either by operation of the usual pedal actuated distributor or by the hand actuated auxiliary distributor by preventing loss of pressure through the not operated distributor.

It is an object of the present invention to effect hand braking of a towed vehicle (trailer or semitrailer), by using the same distributor as that operated by the brake pedal, and eliminating the auxiliary distributor and its auxiliary parts (cutting off valve, intake and inflow pipes).

The invention is characterised in that, in the usual duplex distributor, a hand operable mechanical device is embodied that acts upon the distributor controlling the trailer brakes by means of the same rocker end that operates the distributor during the usual pedal braking.

The hand control of the trailer distributor does not act upon the mechanism that is directly connected to the brake pedal, and leaves practically unaltered the stroke and load on the push rod, and therefore on the brake pedal. The hand control may be released or it may be operated wholly or partly. A suitable return spring, applied to the rocker fulcrum, operates in such a way that the hand control of the trailer distributor does not cause any alteration of the fulcrum position and therefore of the rest position of the push rod and brake pedal.

A further feature of the invention is the application of a stop switch beside the trailer distributor, which is controlled by a rocker projection both when said distributor is operated through the push rod connected to the brake pedal and when it is operated by the hand control.

The invention will be explained, by way of example, in connection with the accompanying drawing which illustrates very diagrammatically a duplex air distribution plant provided with a hand control and a stop switch according to the invention.

As illustrated in the drawing, a push rod 1 is connected to the brake pedal (not shown) of a tractor unit. A regulation spring 2 provides a resilient connection between said push rod to a rocker 3 for controlling the two distributors of the distribution plant. An end of the rocker 3 controls the distributor $d_1$ of the distribution plant, and the other end of the rockers controls the distributor $d_2$. The regulation spring 2 is inserted between caps 4 and 5, the cap 4 underlying the push rod 1 and the cap 5 being connected by a rod 6 to the rocker 3.

The rod 6 has for this purpose a ball end 6' that engages with a suitable rocker seat 3' whereby the rocker can freely rock about the ball end 6' as a fulcrum, and at the same time a motion of the rocker axially of the rod 6 can take place during the action of the brake pedal.

A suitable reaction spring 7 acts against the motion of the rocker caused by the rod 6.

The distributors $d_1$ and $d_2$ are of well known kind and each of them comprises substantially: a push rod ($p_1$, $p_2$) to control the inlet valve ($V_1$, $V_2$)), a feed pipe ($i_1$, $i_2$) and a duct directed to the braking section ($c_1$, $c_2$).

It is assumed for clarity that the duct $c_1$ of distributor $d_1$ feeds the tractor braking members and the duct $c_2$ feeds the like trailer members.

According to the invention, a hand controlled mechanical device 8 for operation of the trailer distributor $d_2$ is positioned adjacent that distributor on the opposite side of the rocker 3 therefrom. The hand controlled device 8 is operated by means of a suitable lever 9 which is connected by means of a tie for convenient actuation from the driver's seat. The mechanical device 8 comprises a regulation spring 10 and is positioned between a first cap 11 and a second cap 12. The first cap is moved toward the spring 10 by means of the lever 9; and the second cap is in contact, through a rod 13, with a ball end 14 of the rocker 3 by which the push rod $p_2$ is operated.

During usual operation of the pressure distribution plant, the driver brakes both the tractor unit and the trailer unit by stepping on the brake pedal, thereby actuating the push rod 1 in the direction of the arrow $f$. The push rod controls, with balanced pressure, both distributors $d_1$ and $d_2$ through the regulation spring 2, the rod 6 and the rocker 3. Equal feeding of air pressure to the tractor brakes and the trailer brakes therefore takes place. During pedal braking the mechanical device 8 remains at rest.

Operation of the hand controlled mechanical device 8 takes place when hand control is applied to the lever 9. During this operation a compression of the regulation spring 10 and therefore a thrust action on the end 14 of the rocker through the rod 13 and a rocker action on distributor $d_2$ takes place.

The hand contol through the regulation spring can be graduated so ahat the pressure transmission to the trailer is proportional to the lever stroke.

It is to be pointed out that, during the hand control, rotation in a clockwise direction of the rocker 3 about the fulcrum 6' takes place, the seat 3' remaining in fixed position owing to the action of spring 7. This enables the unit 1—2—6 to be maintained at rest during hand control.

Only one regulation spring 2 is employed instead of a spring for each distributor, as is usually the case with distributors having more than one section.. The purpose of this design is to prevent angular deflection of the rocker, except during hand control of distributor $d_2$.

Thus operation strokes of the distributors by means of the usual pedal operation are practically equal. Pedal operation may be carried out with the distributors initially at rest, or this operation may be performed with the distributor $d_2$ already operated by the device 8 under hand control.

The distribution plant is supplemented by a stop switch I fitted to the side of trailer distributor $d_2$, the axis of said stop switch being parallel to the axis of said distributor. The stop switch is operated under the control of a rocker projection 15 on the side of the rocker adjacent the trailer distributor $d_2$. In such a way the stop switch is operated, and the stop lamp under the control thereof is lighted by operation of the distributor $d_2$ performed either in the usual way by means of push rod 1 or by the hand device 8 through the lever 9.

The mechanical resistance of the stop switch would cause alteration of the distributor operation balance, whether the distributor is operated by the push rod or the hand device; but said balance is rest by a spring 16 interposed between the cap 12 and a little dish or shallow cup 17 at the rocker end 14. The force of the spring 16 is gauged to balance the force exerted by the stop switch on the rocker. The spring 16 is further designed to maintain at reset the control unit operated by the lever 9, when the distributor is being operated by the usual brake pedal 1' and therefore of push rod 1.

I claim:

1. A duplex type compressed air distributor mechanism for braking composite vehicles, one unit of the composite vehicle having a brake pedal, said mechanism comprising a distributor section for each vehicle unit, a rocker having end portions positioned to make contact with and to actuate each of said distributor sections, a push rod having one end connected to the brake pedal and the other end pivotally connected to the rocker between its points of contact with said distributor sections, manual control means operatively connected to one end portion of said rocker for independently actuating one of the distributor section, said manual control means comprising an operating lever, a first cap in contact with one end of said operating lever movable thereby in a direction substantially at right angles to said rocker toward the end portion thereof, a second cap between said first cap and said rocker end portion, a rod fixed to said second cap extending therefrom to said end portion of said rocker, and spring means interposed between said caps, whereby upon actuation of the operating lever one end portion of the rocker is tilted thereby actuating one of the distributor sections.

2. A duplex type compressed air distributor mechanism according to claim 1, wherein a shallow cup is positioned between one end of the rod and the end portion of the rocker, and spring means interposed between the second cap and the shallow cup thereby maintaining the shallow cup in contact with the end portion of the rocker.

3. A duplex type compressed air distributor mechanism according to claim 1, wherein stop light switch means is disposed adjacent said independently actuated distributor section and a projection formed on the end portion of said rocker for actuating said switch means, whereby the stop light is illuminated when the composite vehicle is braked and when one unit of the composite vehicle is independently braked.

References Cited in the file of this patent

UNITED STATES PATENTS

| 1,418,434 | Finch et al. | June 6, 1922 |
| 2,206,656 | Boldt | July 2, 1940 |
| 2,680,654 | Edge et al. | June 8, 1954 |
| 2,964,360 | Alfieri | Dec. 13, 1960 |

FOREIGN PATENTS

| 713,107 | Germany | Oct. 31, 1941 |
| 315,375 | Italy | Feb. 23, 1934 |
| 549,930 | Italy | Oct. 18, 1956 |